United States Patent

Takemoto

(10) Patent No.: US 9,075,142 B2
(45) Date of Patent: Jul. 7, 2015

(54) DEVICE AND METHOD FOR SELECTING SIGNAL, AND RADAR APPARATUS

(71) Applicant: Furuno Electric Co., Ltd., Nishinomiya (JP)

(72) Inventor: Sae Takemoto, Nishinomiya (JP)

(73) Assignee: Furuno Electric Co., Ltd., Nishimomiya (JP)

(*) Notice: Subject to any disclaimer, the term of this patent is extended or adjusted under 35 U.S.C. 154(b) by 347 days.

(21) Appl. No.: 13/749,640

(22) Filed: Jan. 24, 2013

(65) Prior Publication Data

US 2013/0187806 A1   Jul. 25, 2013

(30) Foreign Application Priority Data

Jan. 25, 2012 (JP) ................. 2012-013352

(51) Int. Cl.
  *G01S 13/72* (2006.01)
  *G01S 13/58* (2006.01)
  *G01S 13/93* (2006.01)

(52) U.S. Cl.
  CPC ............ *G01S 13/72* (2013.01); *G01S 13/582* (2013.01); *G01S 13/589* (2013.01); *G01S 13/726* (2013.01); *G01S 13/9307* (2013.01)

(58) Field of Classification Search
  CPC ..... G01S 13/72; G01S 13/589; G01S 13/582; G01S 13/9307; G01S 13/726
  USPC .......... 342/90, 95–97, 107–108, 189
  See application file for complete search history.

(56) References Cited

U.S. PATENT DOCUMENTS

| 7,298,327 | B2 * | 11/2007 | Dupray et al. | 342/451 |
| 2007/0018888 | A1 * | 1/2007 | Fujikawa et al. | 342/185 |
| 2008/0100503 | A1 * | 5/2008 | Yanagi et al. | 342/176 |
| 2010/0289690 | A1 | 11/2010 | Dai | |
| 2013/0113647 | A1 * | 5/2013 | Sentelle et al. | 342/22 |
| 2014/0062760 | A1 * | 3/2014 | Asada et al. | 342/107 |

FOREIGN PATENT DOCUMENTS

| GB | 2423657 A * | 8/2006 |
| JP | 2010266292 A | 11/2010 |
| WO | WO 2012114816 A1 * | 8/2012 |

* cited by examiner

*Primary Examiner* — John B Sotomayor
(74) *Attorney, Agent, or Firm* — Alleman Hall McCoy Russell & Tuttle LLP (57) ABSTRACT

A signal selecting device is provided. The signal selecting device includes a transceiver for repeatedly transceiving electromagnetic waves, a target candidate detecting module for detecting a plurality of objects based on echo signals received by the transceiver, a phase change amount calculating module for calculating a phase change amount between two echo signals from two positions of which distances from the transceiver are substantially the same but azimuths from the transceiver are different, and an object selecting module for selecting a predetermined object among the plurality of objects detected by the target candidate detecting module in a first scan based on a phase change amount of the object, the predetermined object being the same object as an object selected by the object selecting module in a second scan that is performed before the first scan.

12 Claims, 8 Drawing Sheets

DEVICE AND METHOD FOR SELECTING SIGNAL, AND RADAR APPARATUS

CROSS-REFERENCE TO RELATED APPLICATION(S)

The application claims priority under 35 U.S.C. §119 to Japanese Patent Application No. 2012-013352, which was filed on 25 Jan. 2012, the entire disclosure of which is hereby incorporated by reference.

TECHNICAL FIELD

The present invention relates to a configuration of a signal selecting device for selecting, among echo signals from a plurality of reflective objects, one or more of the echo signals of at least one object.

BACKGROUND OF THE INVENTION

Conventionally, with TTs (Target Trackings) and ARPAs (Automatic Radar Plotting Aids) (hereinafter, referred to as the TT) of ship radars, when selecting a target to be captured and tracked from a plurality of reflective objects, positions of the objects have been obtained by a first scan, a position of the target object that is predicted to be acquired in the first scan has been calculated based on a position and velocity information of the target object obtained by a second scan performed before the first scan, and the positions of the objects obtained by the first scan have been compared with the predicted position. Here, the object obtained in the first scan which is closest to the predicted position has been selected to be the target object (Nearest Neighbor Method). In some other cases, information including size, shape, and difference in position of target candidates have been compared for every scan, and the target object has been selected based on the comparison result. Note that when a rotary antenna is used and it repeats transceiving electromagnetic waves while revolving, transception(s) for one rotation are referred to as one scan, and a single transception is referred to as one sweep.

JP2010-266292A discloses an art relating to a TT function of a radar apparatus, in which a relative velocity between a radar apparatus and an object is estimated based on a plurality of phase change amounts between two echo signals from two positions of which distances and azimuths from the radar apparatus are substantially the same, and a level of possibility of crashing into the object is obtained based on the relative velocity. By being based on the phase change amount between the sweeps of the radar, the velocity information of the object can be acquired in real time, and a TT function with higher accuracy can be achieved.

However, there have been some problems with the above-described conventional methods for selecting the target object. In radar apparatuses, different signals (e.g., signals with different intensities) are received in every scan, and therefore, radar images of the echo signals change in every scan. Therefore, with the conventional configurations and methods for comparing the information for every scan and selecting the target object based on the correlation value obtained from the comparison, there have been cases where information of the target candidate becomes unstable between scans and where, when objects with similar shapes and sizes are close to each other, an object to be the target candidate is not visibly recognized (lost) and/or a different object is tracked (swop).

Alternatively, a reception signal may be binarized with respect to a threshold of a signal level. Therefore, depending on how the threshold is set, a small object, such as a buoy or a small-sized ship, from which a signal level is low is not even recognized as one of the candidates in the selection. As for an object of which a signal level is around the threshold, a detection situation changes in every scan, and thus, the cases of lost and swop have occurred.

Furthermore, the target candidate information also becomes unstable when an object exists within a range with sea surface reflection and/or clutter. Thus, the cases of lost and swop have occurred.

SUMMARY OF THE INVENTION

The present invention is made in view of the above situation, and it provides a device for selecting an object in higher accuracy than devices with the conventional configurations.

According to an aspect of the invention, a signal selecting device is provided. The device includes a transceiver for repeatedly transceiving electromagnetic waves, a target candidate detecting module for detecting a plurality of objects a based on echo signals received by the transceiver, a phase change amount calculating module for calculating a phase change amount between two echo signals from two positions of which distances from the transceiver are substantially the same but azimuths from the transceiver are different, and an object selecting module for selecting an object among the plurality of objects detected by the target candidate detecting module in a first scan based on a phase change amount of the object, the object being the same object as an object selected by the object selecting module in a second scan that is performed before the first scan.

With such a configuration, method, and a device having the configuration, even when objects with similar shapes and sizes are close to each other, the lost of the tracking object (target object) and/or the swop of the tracking object in which a different object is tracked do not occur. Additionally, even an object with a low signal level which conventionally is not recognized as one of the candidates in the selection can be recognized as one of the candidates. Here, an object selected among the plurality of objects is referred to as the "target" or "target object."

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Hereinafter, embodiments of the present invention are described with reference to the accompanying drawings.

Note that in the embodiments described below, although a signal selecting device of the present invention is described to serve as a TT function of a ship radar apparatus, an application thereof is not limited to the TT function.

(First Embodiment)

Figure 1:
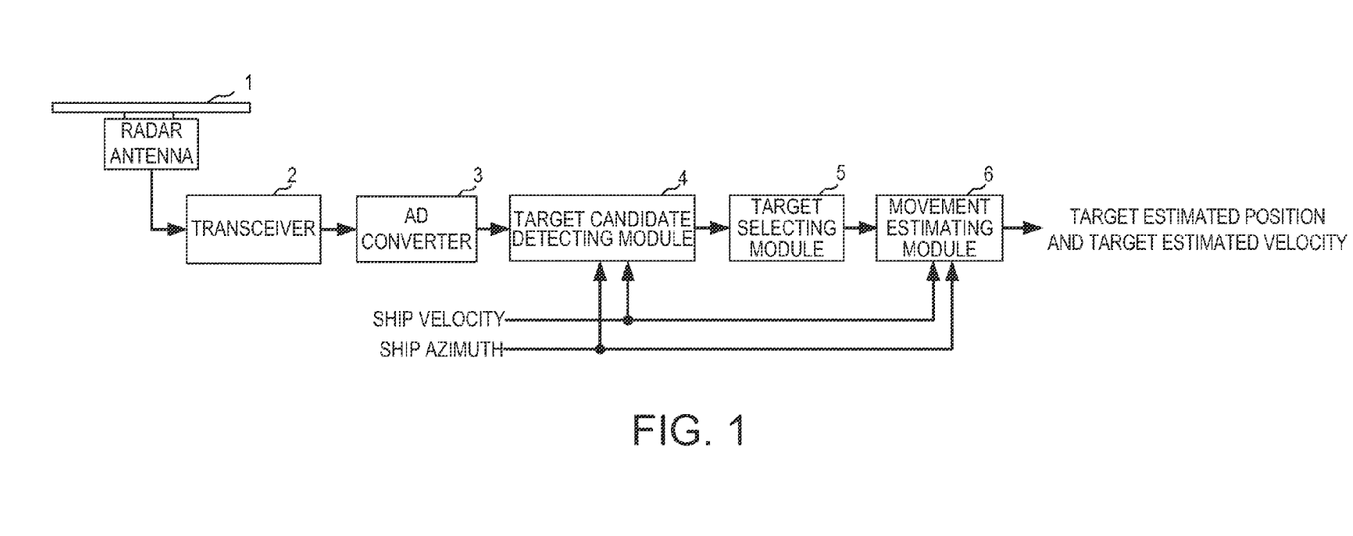
FIG. 1 is a block diagram showing one example of a configuration of a signal selecting device in a first embodiment.

FIG. 1 is a block diagram showing a main configuration of the TT function of the ship radar apparatus according to this embodiment. As shown in FIG. 1, the radar apparatus includes a radar antenna 1, a transceiver 2, an A/D converter 3, a target candidate detecting module 4, a target selecting module 5, and a movement estimating module 6.

The radar antenna 1 revolves on a single plane at a predetermined revolving cycle and the transceiver 2 repeats to transceive signals. Here, a length of time from when the radar apparatus transmits an electromagnetic wave signal until an echo signal caused by the transmitted electromagnetic wave signal returns back thereto is in proportion to a distance from the radar antenna 1 to an object from which the echo signal returns. Therefore, based on the time length from the transmission of the electromagnetic wave signal until the reception of the echo signal caused thereby and an azimuth of the antenna when the transception of the electromagnetic wave signal is performed, a position of the object can be acquired on a polar coordinate system centering on the radar antenna 1.

The transceiver 2 can irradiate signals with directivity (pulse-shaped radio waves) as well as receive echo signals from object(s) existing around the radar apparatus, via the radar antenna 1. Note that the transceiver 2 is not limited to have the rotary antenna. For example, it may be configured as a system that can swing a beam while the antenna is fixed (phased array radar). Here, the transceiver 2 receives an unnecessary echo signal caused by, for example, a sea surface reflection, and an interference signal, other than the echo signals from the object(s). The signals received by the transceiver 2, such as the echo signals from the object(s), the unnecessary echo signal caused by, for example, the sea surface reflection, and the interference signal are all referred to as "the reception signals." Note that the reception signal may contain white noise. Moreover, the transceiver 2 performs an orthogonal detection (IQ phase detection) so as to acquire information in amplitude and phase of each reception signal. By performing the orthogonal detection, a complex signal composed of an I signal and a Q signal can be obtained. The orthogonal detection is described later in detail.

The A/D converter 3 converts the I and Q signals which are analog signals outputted from the transceiver 2 into digital data of a plurality of bits (IQ signal reception data), and outputs them to the target candidate detecting module 4. Note that other than the method of digital conversion by the A/D converter 3 after the I and Q signals which are analog signals are generated by the transceiver 2, the I and Q signals can be generated directly in the form of digital signals by sampling the reception signal by the transceiver 2. In this case, the A/D converter 3 may be omitted.

Figure 2:
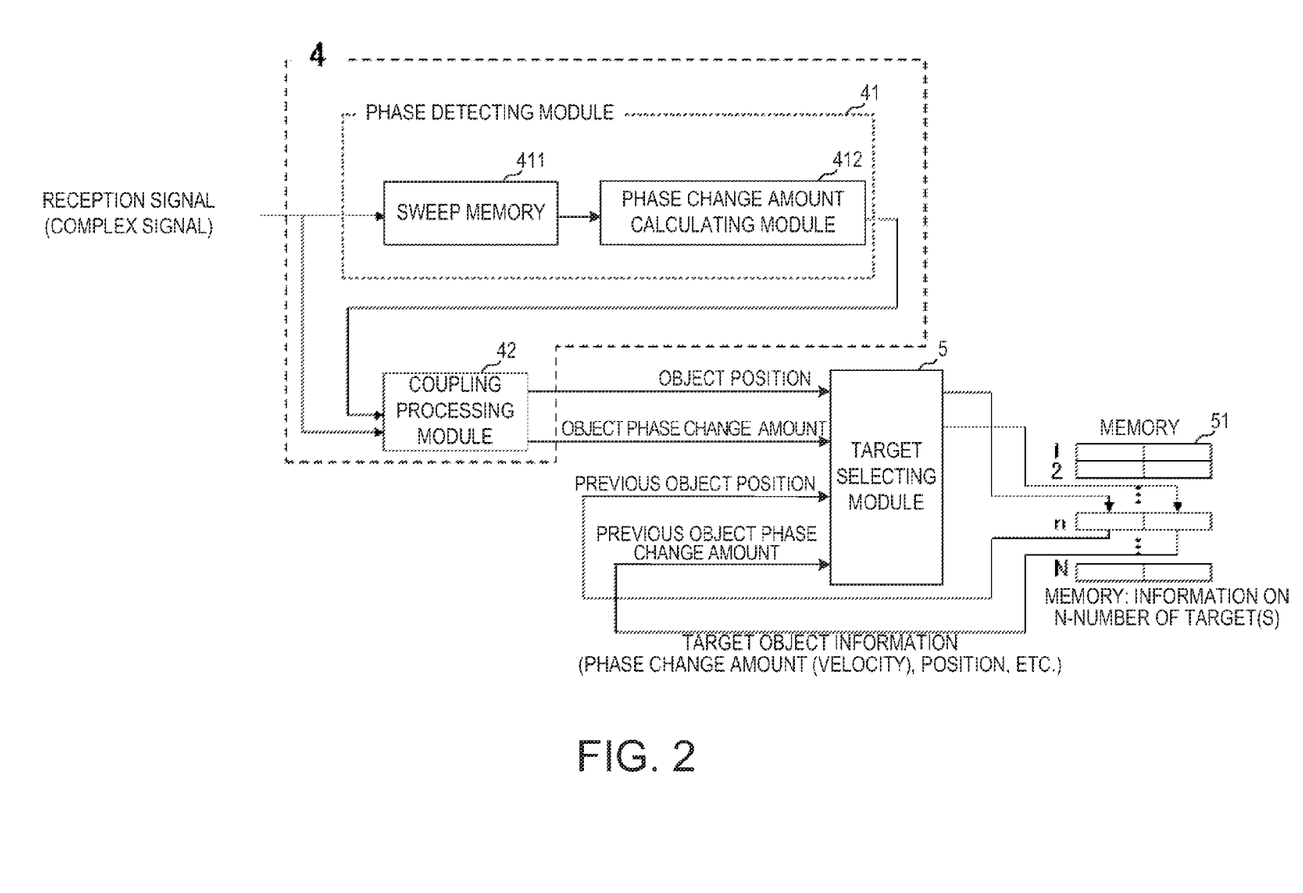
FIG. 2 is a block diagram showing one example of a configuration of a main part of the signal selecting device.

The target candidate detecting module 4 detects echo signals of the object among the reception signals, and generates information of the target, such as its position, size, phase change amount, and velocity. As shown in FIG. 2, the target candidate detecting module 4 includes a phase detecting module 41 and a coupling processing module 42. Moreover, the phase detecting module 41 has a sweep memory 411 and a phase change amount calculating module 412.

The phase detecting module 41 calculates a phase change amount between two echo signals from two sampled positions of which distances from the radar antenna 1 are substantially the same but azimuths therefrom are different, and the phase detecting module 41 outputs the phase change amount information to the coupling processing module 42.

The sweep memory 411 is a so-called buffer and stores the IQ signal reception data for a required number of sweeps in real time. Here, the "sweep" indicates a series of operation from a signal transmission to the next signal transmission.

The phase change amount calculating module 412 calculates each phase change amount between two of the signals received by the transceiver 2 from the two positions of which the distances from the radar antenna 1 are substantially the same but the azimuths therefrom are different. The calculating method is described later in detail.

The coupling processing module 42 performs coupling processing (grouping) of a plurality of echo signals from object(s) according to a predetermined condition, and generates information of the group, such as its representative position, size, phase change amount, and velocity.

Figure 3:
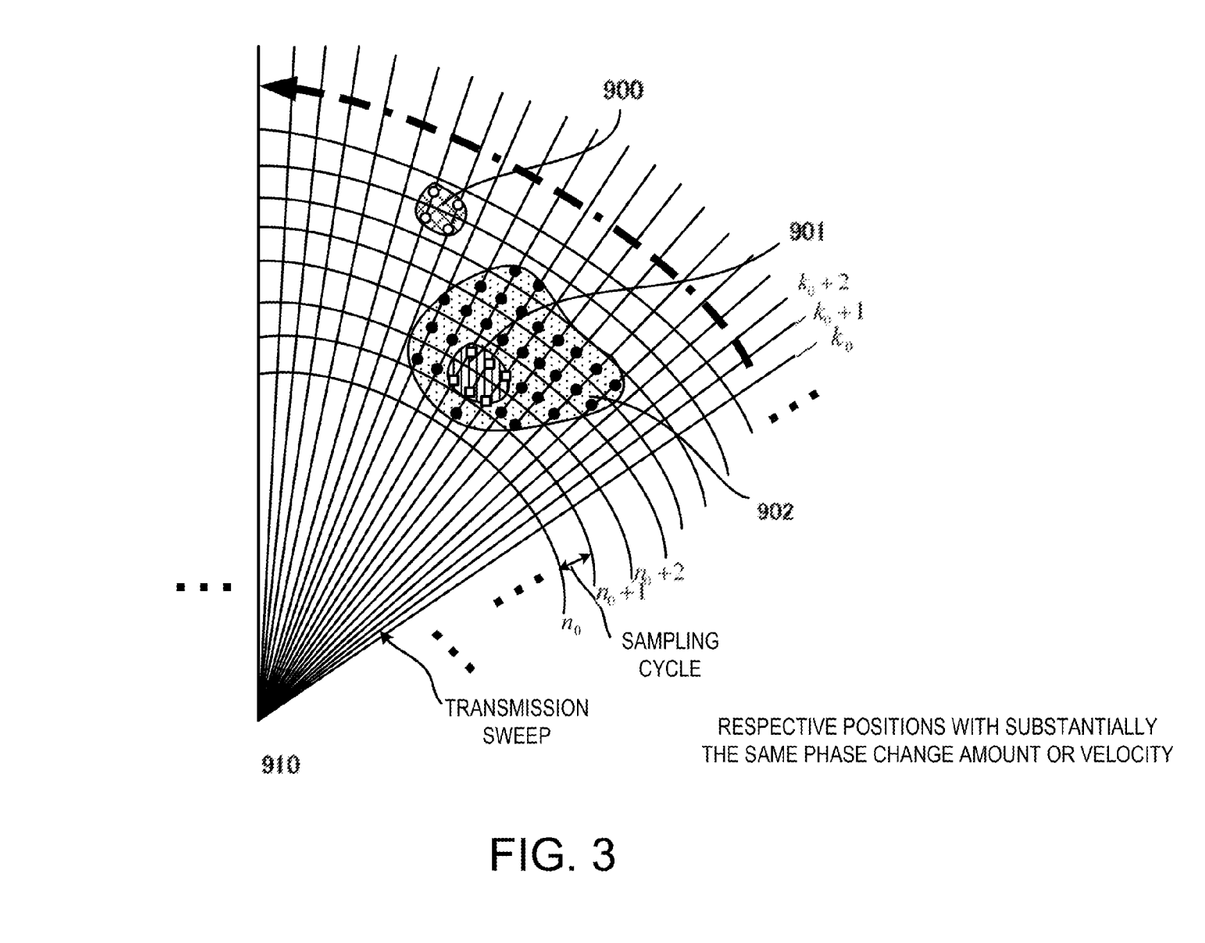
FIG. 3 is a view showing one example of coupling processing based on phase change amount information.

In this embodiment, the coupling processing method based on the phase change amount calculated by the phase change amount calculating module 412 is described. FIG. 3 shows sampled positions of the reception signals received in every sweep centering on a ship 910 provided with the radar antenna 1 (hereinafter, referred to as "the ship concerned" or simply referred to as "the ship"). When objects 900 and 901, and a reflective object 902, are arranged as in FIG. 3, among the sampled positions, positions which are close to each other and phase change amounts thereof are substantially the same are grouped, and thus, reflective objects close to each other and an object within a sea surface reflection range can be selected. Note that although the coupling processing method based on the phase change amount is described in this embodiment, the coupling processing method of the signal selecting device of the invention is not limited to this and it may be any method. For example, it may be a method for calculating a relative velocity or an absolute velocity based on the phase change amount and performing the coupling based on the velocity information, or a method for binarizing the reception signals by setting a threshold, and coupling only reception signals which are close to each other and levels thereof are above the threshold.

The target selecting module 5 includes a memory 51 and selects at least one object to be captured and tracked among a plurality of objects.

The memory 51 stores, for every scan, the information of the position and phase change amount of the echo signal from the representative position among the echo signals of the at least one object to be captured and tracked. Note that, instead of the representative position, it may be an average value of, for example, positions or phase change amounts of a plurality of echo signals (may simply referred to as "the echo") which are identified to be from the same object.

The target selecting module 5 compares phase change amounts and positions of a plurality of objects detected by the target candidate detecting module 4 in a first scan with the phase change amount and position of the at least one object selected by the target selecting module 5 in a second scan performed before the first scan, and the target selecting module 5 selects an object with a highest correlation in the phase change amount and/or a highest correlation in the position is selected among the plurality of objects detected by the target candidate detecting module 4 in the first scan. Specifically, weighting coefficients $w_1$ and $w_2$ are set, and an object with which a smallest value is obtained from (difference of phase change amount)$^2 \times w_1$+(difference of position)$^2 \times w_2$ is selected. Here, each of the differences of the phase change amount and position indicates a change amount thereof between the first and second scans. The weightings on the time change amount of the phase change amount and the change amount of the position can be changed depending on the situation. For example, when a plurality of objects exist around the radar apparatus or when an object exists within the sea surface reflection range, the time change amount of the phase change amount has a higher reliability than the change amount of the position, and therefore, a more accurate selection can be performed by increasing the weight on the time change amount of the phase change amount. Note that the specific method for calculating the correlation value is not limited to this. In this manner, the object to be captured and tracked can be selected in higher accuracy than the conventional manners not only when the plurality of objects exist around the radar apparatus, but also when the object exists within the sea surface reflection range and when an object is close to the radar apparatus.

Note that the target selecting module 5 of this embodiment selects the object based on the information of the phase change amount and the position; however, the object can be selected in higher accuracy than the conventional manners even based only on the phase change amount. Moreover, for example, when it is preferred to generate velocity information according to the processing performed after the processing of the target selecting module 5, velocity information of the object based on the phase change amount (Doppler velocity information) may be applied instead of the phase change amount information. The selecting method using the velocity information of the object based on the phase change amount is described in the section "Second Embodiment."

The movement estimating module 6 calculates an estimated position, estimated velocity, and predicted position of the object selected by the target selecting module 5. Further, the movement estimating module 6 is configured with an α-β tracker and it obtains an estimated position to be between (e.g., in the middle of, an average position between, or a smoothing position between) a current predicted position of the object (calculated in the previous scan) and the observed position (position) of the selected object, and further obtains the estimated velocity based on the calculated estimated position. Moreover, the predicted position of the object can be calculated using the estimated position and the estimated velocity. The specific method is described later.

The orthogonal detection performed by the transceiver 2 is described with reference to FIG. 4. Here, a carrier wave of the electromagnetic wave signal transmitted from the radar antenna 1 is assumed to be a cosine wave at a frequency $f_0$. In this case, when an elapsed time from the transmission of the electromagnetic wave signal is "t", and an amplitude of the reception signal inputted to the transceiver 2 is "X(t)", a reception signal S(t) can be expressed as Equation 1, wherein "ø(t)" is a phase of the carrier wave of the reception echo with respect to the carrier wave of the electromagnetic wave signal (hereinafter, simply referred to as the phase).

$$S(t)=X(t)\cdot\cos\ [2\pi f_0 t+\phi(t)] \quad (1)$$

Figure 4:
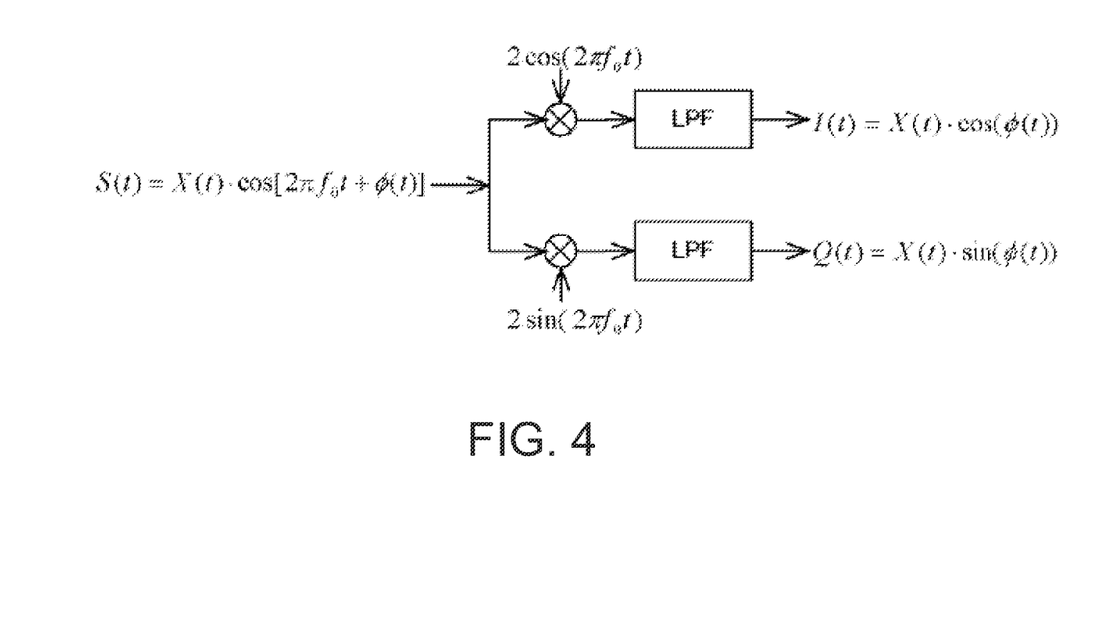
FIG. 4 is a view for explaining an orthogonal detection.

As shown in FIG. 4, the reception signal S(t) is separated into two sequences after being received by the transceiver 2. One of the components of the separated reception signal S(t) is added a reference signal $2\cos(2\pi f_o t)$ having the same frequency and phase as the carrier wave of the electromagnetic wave signal so as to be combined, and thereby, a signal expressed by Equation 2 is obtained.

$$S(t)\cdot 2\cos(2\pi f_o t)=X(t)\cdot\cos\ [4\pi f_o t+\phi(t)]+X(t)\cdot\cos\ [\phi(t)] \quad (2)$$

Moreover, the other component of the separated reception signal S(t) is added a reference signal $-2\sin(2\pi f_o t)$ having the same frequency as the carrier wave of the electromagnetic wave signal and a phase shifted by 90° therefrom so as to be combined, and thereby, a signal expressed by Equation 3 is obtained.

$$S(t)\cdot -2\sin(2\pi f_o t)=X(t)\cdot\sin\ [4\pi f_o t+\phi(t)]+X(t)\cdot\sin\ [\phi(t)] \quad (3)$$

The first terms on the right-hand (double frequency component) in Equations 2 and 3 are removed by a low pass filter (LPF). In this manner, the I signal indicated by Equation 4 and the Q signal indicated by Equation 5 are outputted from the transceiver 2.

$$1(t)=X(t)\cdot\cos\ [\phi(t)] \quad (4)$$

$$Q(t)=X(t)\cdot\sin\ [\phi(t)] \quad (5)$$

Next, the calculating method of the phase change amount which is calculated by the phase change amount calculating module 412 is described. In this embodiment, a self correlation method is applied to the reception signal digitalized by the A/D converter 3 and the reception signals stored in the sweep memory so as to calculate the phase change amount. Here, it is assumed that an echo with a phase change amount of $\Delta\theta$ exists. A distance from the ship to an object corresponding to the echo is indicated as "$n_0$" and an azimuth from which the echo of the object is first received is indicated as "$k_0$" (see FIG. 3). Here, when the number of reception data received from positions close to each other and having substantially the same distances from the radar antenna 1 is M, the respective reception data can be indicated as $S[k_0, n_0]$, $S[k_0+1, n_0]$, $S[k_0+2, n_0]$, ..., $S[k_0+M-1, n_0]$. The reception data z[m] can be expressed as Equation 6.

$$Z[m]=S[k_0+m,n_0]\ (0\leq m\leq M-1) \quad (6)$$

Additionally, the following equation can be established with respect to the phase change amount $\Delta\theta$ for one sweep.

$$\Delta\theta = \frac{1}{\Delta m}\arg\left[\sum_{m=0}^{L-1} z^*[m]\cdot z[m+\Delta m]\right] \quad (7)$$

wherein arg[•] indicates an argument of a complex number. "$\Delta m$" and "L" are arbitrary natural numbers satisfying the following equation.

$$\Delta m+L\leq M \quad (8)$$

For example, when $\Delta m=L=1$, the following equation can be obtained.

$$\Delta\theta=\arg[z^*[0]\cdot z[1]] \quad (9)$$

The method for estimating the phase change amount $\Delta\theta$ based on the reception data z[m] by using Equation 7 is referred to as the self correlation method.

Figure 5:
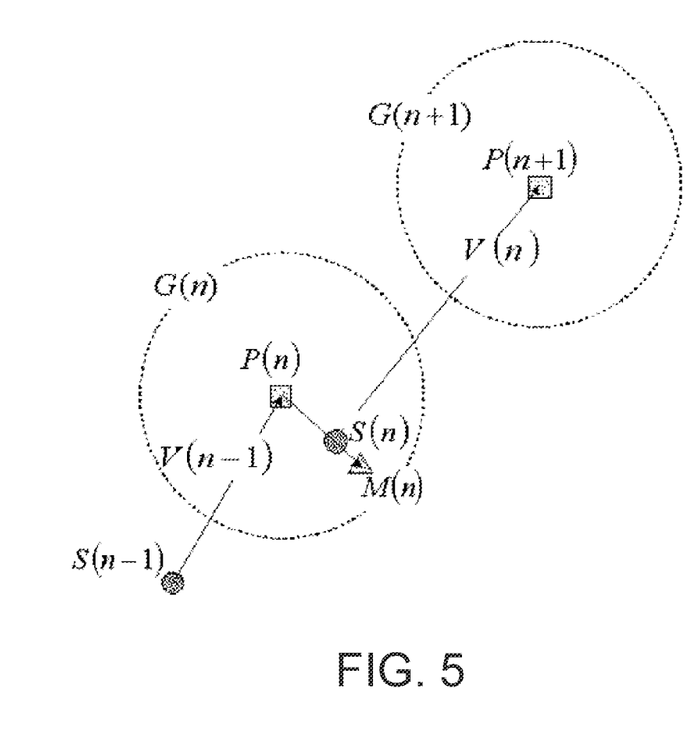
FIG. 5 is a schematic view illustrating a method for estimating a movement of an object by a movement estimating module.

Next, regarding the object movement estimating method of the movement estimating module 6, one example using the αβ tracker is described. FIG. 5 is a view illustrating a tracking method of the αβ tracker. Here, the αβ tracker is used as a linear predictor in which a position smoothing constant is α and a velocity smoothing constant is β, and a method for predicting an (n+1)-th scan based on an n-th scan is illustrated. In the n-th scan, when a predicted position is P(n) and an observed position is M(n), a tracking error is E(n) is E(n)=M(n)−P(n). A smoothing position S(n) and a smoothing velocity V(n) are obtained from the following equations.

$$S(n)=P(n)+\alpha E(n) \quad (10)$$

$$V(n)=V(n-1)+\beta\cdot E(n)/T \quad (11)$$

Here, "T" is a sampling cycle. Based on the equations, a predicted position in the (n+1)-th scan (P(n+1)) is obtained from the following equation.

$$P(n+1) = S(n) + V(n)T \quad (12)$$

α=0 corresponds to that the predicted position is the smoothing position and α=1 corresponds to that the observed position is the smoothing position, which mean that the smoothing is performed to higher extent as α is smaller. Here, the smoothing position corresponds to the estimated position, and the smoothing velocity corresponds to the estimated velocity.

As described above, the object can be selected regardless of the size, shape and amplitude of the echo which have changed in every scan in the conventional arts. Therefore, an object that is captured and tracked can be selected among a plurality of objects in high accuracy and in real time, and capturing and tracking performances of the TT function can be improved.

(Second Embodiment)

Figure 6:
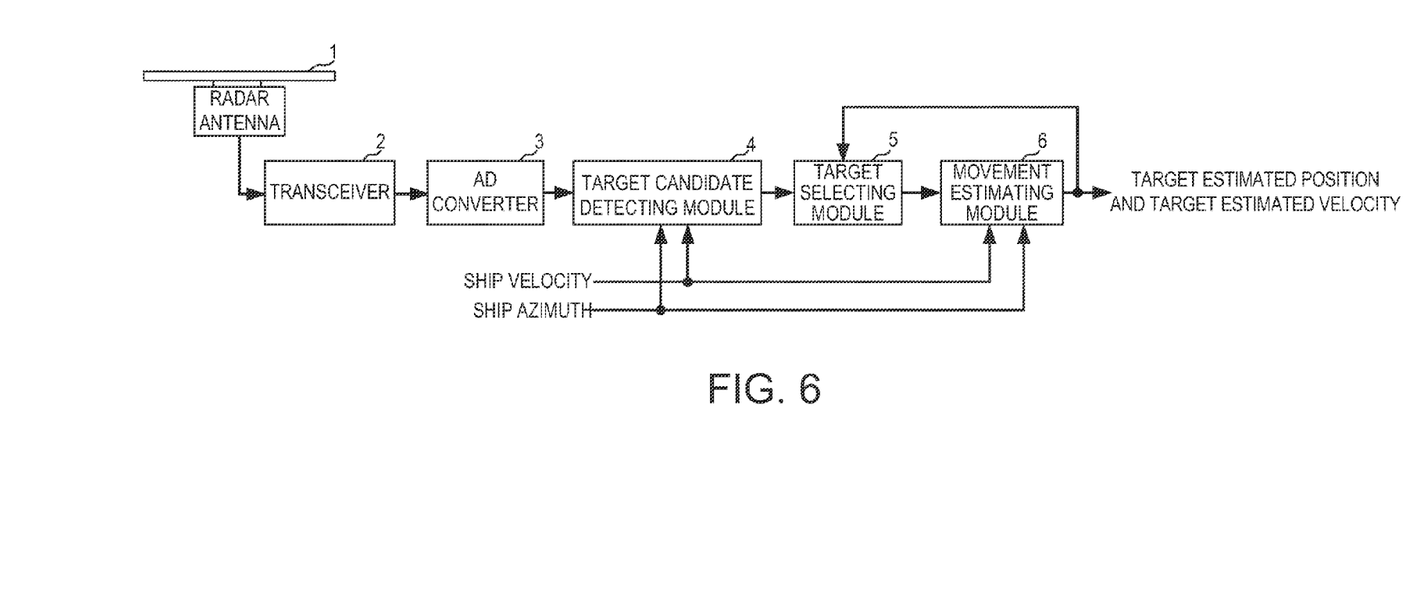
FIG. 6 is a block diagram showing one example of a configuration of a signal selecting device in a second embodiment.

FIG. 6 is a block diagram showing a main configuration of a TT function according to this embodiment. The main components configuring a signal selecting device 10 of this embodiment are similar to the radar apparatus described in the first embodiment, and among the components, the radar antenna 1, the transceiver 2, the A/D converter 3 have the similar functions, and therefore, the description thereof is omitted. Here, a target candidate detecting module 4, a target selecting module 5, and a movement estimating module 6 that have different functions from those of the first embodiment are described with reference to FIG. 7. Note that, in the second embodiment, "velocity (relative velocity and absolute velocity)" means a velocity vector of a distance direction component, in which "relative velocity" means a so called Doppler velocity.

Figure 7:
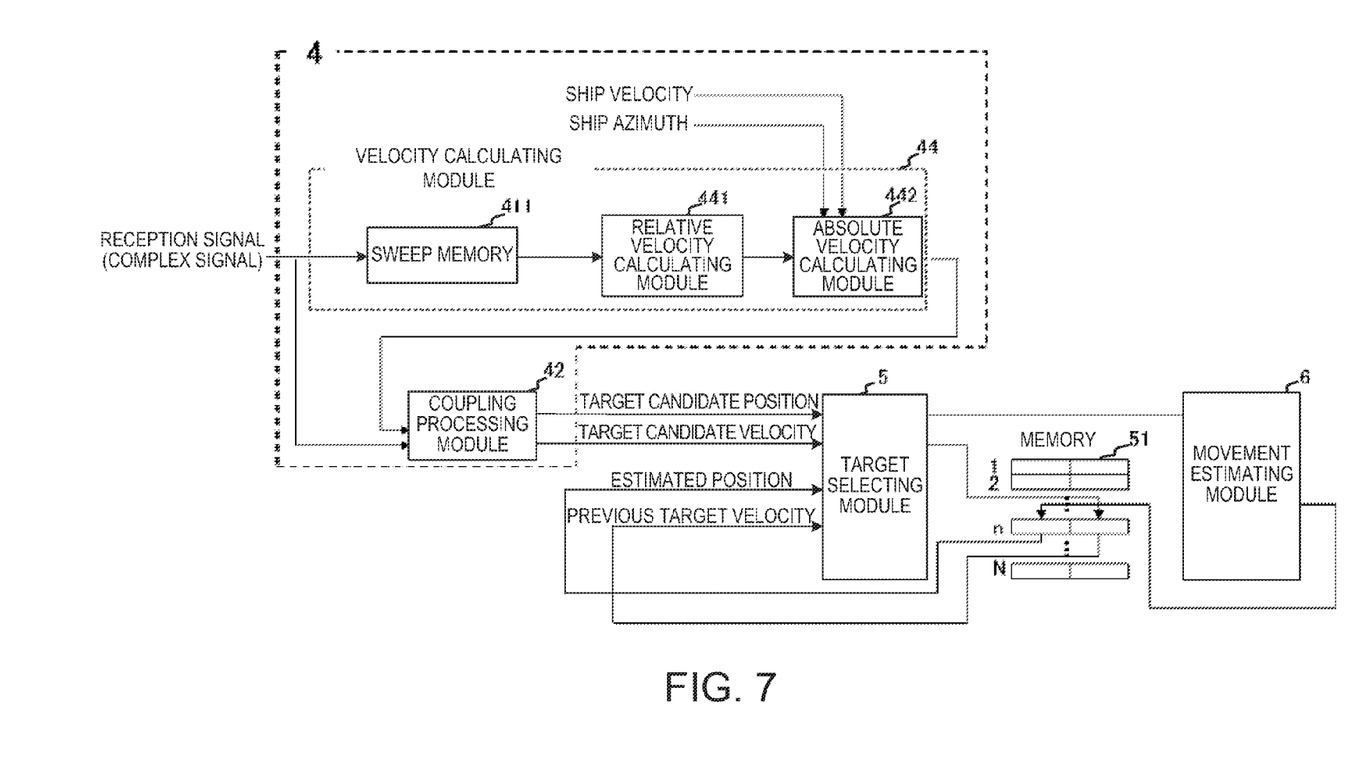
FIG. 7 is a block diagram showing one example of a configuration of a main part of the signal selecting device in the second embodiment.

The target candidate detecting module 4 includes a velocity calculating module 44, and a coupling processing module 42. Moreover, the velocity calculating module 44 has a sweep memory 411, a relative velocity calculating module 441, and an absolute velocity calculating module 442.

The velocity calculating module 44 calculates an absolute velocity of an object based on a phase change amount between two echo signals from two sampled positions of which distances from the radar antenna 1 are substantially the same but azimuths therefrom are different, the two positions corresponding to the object. The velocity calculating module 44 outputs absolute velocity information to the coupling processing module 42.

Furthermore, the relative velocity calculating module 441 calculates a relative velocity between the ship and the object based on a phase change amount between two of the echo signals received by the transceiver 2 from the two positions of which the distances from the radar antenna 1 are substantially the same but the azimuths therefrom are different. The specific calculating method is similar to the method described above.

The absolute velocity calculating module 442 calculates the absolute velocity of the object based on the relative velocity calculated by the relative velocity calculating module 441, a velocity of the ship acquired by, for example, a GPS receiver, and a bow azimuth acquired by, for example, an azimuth sensor.

The target selecting module 5 includes a memory 51 and selects at least one object to be captured and tracked among a plurality of objects. The memory 51 stores, for every scan, the information of the position and absolute velocity of the representative position of the echo signal of the at least one object to be captured and tracked. Note that instead of the representative position, it may be an average value of, for example, positions or absolute velocities of a plurality of echo signals which are identified to be from the same object. The target selecting module 5 compares absolute velocities and positions of a plurality of objects detected by the target candidate detecting module 4 in a first scan with the absolute velocity and position of the at least one object selected by the target selecting module 5 in a second scan performed before the first scan, and the target selecting module 5 selects an object with a highest correlation in the absolute velocity and the position is selected among the plurality of objects detected by the target candidate detecting module 4 in the first scan. Specifically, weighting coefficients $w_1$ and $w_2$ are set, and an object with which a smallest correlation value is obtained from (difference of absolute velocities)$^2 \times w_1$+(difference of position)$^2 \times w_2$ is selected. Here, each of the differences of the absolute velocity and position indicates a change amount thereof between the first and second scans. The weightings on the time change amount of the absolute velocity and the change amount of the position can be changed depending on the situation. For example, when a plurality of objects exist around the radar apparatus or when an object exists within the sea surface reflection range, the change amount of the absolute velocity has a higher reliability than the change amount of the position, and therefore, a more accurate selection can be performed by increasing the weight on the change amount of the absolute velocity.

Note that the specific method for calculating the correlation value is not limited to this. In this manner, the object to be captured and tracked can be selected in higher accuracy than the conventional manners not only when the plurality of objects exist around the radar apparatus, but also when the object exists within the sea surface reflection range and when an object is close to the radar apparatus. Moreover, in this embodiment, although the selecting method based on the absolute velocity is described, the relative velocity of the object which is calculated in the process of calculating the absolute velocity may be applied instead of the absolute velocity.

Here, the method for calculating the relative velocity (Doppler velocity) of the object is described in detail. The relative velocity can be calculated based on the phase change amount as follows. When the object approaches to the ship at a relative velocity v, a round-trip propagation distance from the radar antenna 1 to the object is reduced by 2vt within a transmission period T. Therefore, when a frequency of a carrier wave is $f_0$ and a velocity of light is c, the phase of reception data z[m+1] is larger than a phase of reception data z[m] by a phase change amount Δθ for one sweep expressed by the following equation.

$$\Delta \theta = 2\pi \frac{2vT}{c} f_0 \quad (13)$$

When this equation is solved with respect to the relative velocity v, the following equation is obtained.

$$v = \frac{\Delta \theta}{4\pi f_0 T} c \quad (14)$$

Moreover, the following equation can be obtained by substituting Equation 7 into Equation 14.

$$v = \frac{c}{4\pi f_0 T} \cdot \frac{1}{\Delta m} \arg\left[\sum_{m=0}^{L-1} z^*[m] \cdot z[m + \Delta m]\right] \quad (15)$$

By using Equation 15, the relative velocity v is estimated from the reception data z[m].

Figure 8:
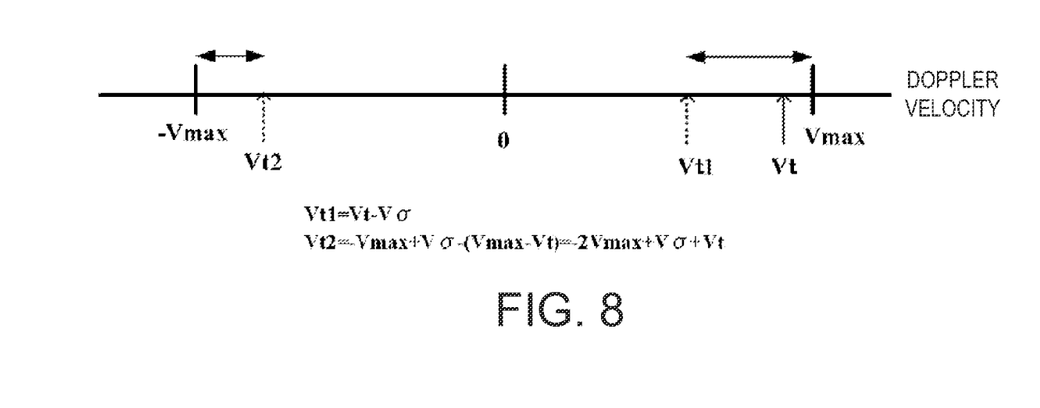
FIG. 8 is a view for explaining a velocity return.

Here, when performing an association (e.g., selecting and coupling) of the echo signals by using the velocities based on the phase change amounts, it is required to consider a returning velocity based on a transmission repeating frequency of the transmission signal of the radar apparatus. When the object moves at a velocity around the returning velocity, an echo at the velocity close to the velocity at which the association is performed is also an association target. When a velocity range where the association is performed is Vt±Vσ, for the echo signal in which the velocity is Vt±Vσ>Vmax (Vmax: returning velocity), the velocity range for the association is Vt−Vσ≤V<Vmax or −Vmax≤V≤−2Vmax+Vt+Vσ (FIG. 8).

As described above, the object can be selected regardless of the size, shape and amplitude of the echo which have changed in every scan in the conventional arts. Therefore, an object that is to be captured and tracked can be selected among a plurality of objects in high accuracy and in real time, and capturing and tracking performances of the TT function can be improved.

The signal selecting devices described in first and second embodiments are merely examples, and it may be modified variously. For example, it can be assumed that by combining the signal selecting device of the present invention and any of the conventional signal selecting methods, a performance of selecting the object improves significantly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A signal selecting device, comprising:
a transceiver for repeatedly transceiving electromagnetic waves;
a target candidate detecting module for detecting a plurality of objects based on echo signals received by the transceiver;
a phase change amount calculating module for calculating a phase change amount between two echo signals from two positions of which distances from the transceiver are substantially the same but azimuths from the transceiver are different; and
an object selecting module for selecting an object among the plurality of objects detected by the target candidate detecting module in a first scan based on a phase change amount for the object, the object being the same object as an object selected by the object selecting module in a second scan that is performed before the first scan.

2. The device of claim 1, wherein the object selecting module selects the same object as the object selected in the second scan based on a correlation value of a phase change amount of each object detected in the first scan with a phase change amount of the object selected in the second scan.

3. The device of claim 1, wherein the object selecting module selects the same object as the object selected in the second scan based on a correlation value of a phase change amount of each object detected in the first scan with a phase change amount of the object selected in the second scan, and a correlation value of an observed position of each object detected in the first scan with an observed position of the object selected in the second scan.

4. The device of claim 1, further comprising a relative speed calculating module for calculating a relative speed between the device and each object based on a phase change amount of each object, wherein the object selecting module selects the same object as the object selected in the second scan based on a calculated relative speed of the object.

5. The device of claim 4, further comprising an absolute speed calculating module for calculating an absolute speed of each object based on the calculated relative speed of each object and an absolute speed of the device,
wherein the object selecting module selects the same object as the object selected in the second scan based on an absolute speed of the object.

6. The device of claim 4, wherein a distance direction component of either one of the relative speed and the absolute speed is calculated by either one of the relative speed calculating module and the absolute speed calculating module.

7. The device of claim 1, further comprising a relative speed calculating module for calculating a relative speed between the device and each object based on a phase change amount of each object; and
a movement estimating module, wherein the movement estimating module comprises:
an estimated speed calculating module for calculating an estimated speed of the object in the first scan based on an observed position and a predicted position of the object in the first scan, and an estimated speed of the object in the second scan;
an estimated position calculating module for calculating an estimated position of the object in the first scan based on the observed position and the predicted position of the object in the first scan; and
a predicted position calculating module for calculating the predicted position of the object in the first scan based on the estimated position and the estimated speed of the object in the second scan, and
wherein the object selecting module selects the same object as the object selected in the second scan based on a correlation value of a relative speed and the observed position of the object detected in the first scan with a relative speed of the object selected in the second scan and the predicted position of the object in the first scan.

8. The device of claim 7, wherein the movement estimating module is configured with an αβ tracker.

9. The device of claim 1, wherein the transceiver repeatedly transceives the electromagnetic waves via an antenna revolving in a single plane.

10. The device of claim 1, further comprising a Doppler speed calculating module for calculating a Doppler speed of each object based on a phase change amount for each object, wherein the object selecting module selects the same object as the object selected in the second scan based on the Doppler speed of the object.

11. A method for selecting a signal, comprising:
repeatedly transceiving electromagnetic waves;
detecting a plurality of objects based on received echo signals;
calculating a phase change amount between two echo signals from two positions of which distances from an own ship are substantially the same but azimuths from the own ship are different; and
selecting an object among the plurality of objects detected by a target candidate detecting module in a first scan based on a phase change amount of the object, the object being the same object as an object selected in a second scan that is performed before the first scan.

12. A radar device, comprising:
a transceiver for repeatedly transceiving electromagnetic waves via an antenna;
a target candidate detecting module for detecting a plurality of objects based on echo signals received by the transceiver;
a phase change amount calculating module for calculating a phase change amount between two echo signals from two positions of which distances from the transceiver are substantially the same but azimuths from the transceiver are different;
an object selecting module for selecting an object among the plurality of objects detected by the target candidate detecting module in a first scan based on a phase change amount of the object, the object being the same object as an object selected by the object selecting module in a second scan that is performed before the first scan; and
a display unit for displaying a radar image showing positions of the plurality of objects.

* * * * *